United States Patent [19]

Kozlik

[11] Patent Number: 4,631,695
[45] Date of Patent: Dec. 23, 1986

[54] DETECTOR OF PREDETERMINED PATTERNS OF ENCODED DATA SIGNALS

[75] Inventor: Tony J. Kozlik, Phoenix, Ariz.

[73] Assignee: Honeywell Inc., Minneapolis, Minn.

[21] Appl. No.: 573,899

[22] Filed: Jan. 24, 1984

[51] Int. Cl.[4] .............................................. G06F 7/02
[52] U.S. Cl. .................................................. 364/715
[58] Field of Search ....................... 340/146.2; 360/42; 364/715

[56] References Cited

U.S. PATENT DOCUMENTS

| | | | |
|---|---|---|---|
| 3,760,355 | 9/1973 | Bruckert | 340/146.2 |
| 3,818,348 | 6/1974 | Puente | 340/146.2 |
| 3,832,685 | 8/1974 | Hendrickson | 340/146.2 |
| 3,855,576 | 12/1974 | Braun et al. | 340/146.2 |
| 3,979,746 | 9/1976 | Jarrett | 360/42 |
| 4,205,302 | 5/1980 | Godo | 340/146.2 |
| 4,246,569 | 1/1981 | Baldwin et al. | 340/146.2 |
| 4,404,542 | 9/1983 | Thomas, Jr. | 340/146.2 |

Primary Examiner—David H. Malzahn
Attorney, Agent, or Firm—A. A. Sapelli; J. S. Solakian; A. Medved

[57] ABSTRACT

A detector of predetermined patterns of Manchester encoded data signals in which the voltage levels of the half-bit cells of "n" sequential Manchester bit cells, where "n" is an integer greater than zero, are clocked into a shift register, the pattern of 2 "n" voltage levels of 2 "n" half-bit cells of the "n" sequential Manchester bit cells stored in the register at any given time are examined by a programmable logic array which produces an output signal when the pattern of outputs of the shift register corresponds to the predetermined patterns.

5 Claims, 4 Drawing Figures

DETECTOR OF PREDETERMINED PATTERNS OF ENCODED DATA SIGNALS

CROSS-REFERENCE TO RELATED APPLICATION

The following copending concurrently filed application relates to the invention of the present application and is incorporated herein by reference:

"Manchester Decoder" by Tony J. Kozlik and Robert L. Spiesman Ser. No. 573,884 filed Jan. 24, 1984 now U.S. Pat. No. 4,542,420 which issued Sept. 17, 1985, which application is assigned to the same assignee as this application.

BACKGROUND OF THE INVENTION

1. Field of the Invention

This invention is in the field of detectors of Manchester encoded data signals, and more particularly to a detector of predetermined patterns of values corresponding to the voltage levels of the half-bit cells of a given sequence of Manchester bit cells, some of which Manchester bit cells represent code violations.

2. Description of the Prior Art

In some token-passing local-area networks, a single communication medium is shared by many modules. Such a network is disclosed and claimed in U.S. patent application Ser. No. 540,061, filed Oct. 7, 1983, by Russell A. Henzel, and entitled "Plant Management System", which application is assigned to the same assignee as this application; namely, Honeywell Inc., the disclosure of which is incorporated herein by reference. In such a token-passing local-area network, a module which has accepted the token from another module has exclusive access to the medium to transmit information to other modules, normally for a limited period of time, at the end of which period the module having the token must transfer the token to another successor module in the network.

In such a local-area network, information is transmitted between modules in frames, where a frame is a set of binary digits. Two types of frames are used in the above-identified network. One type of frame is a token-passing frame, or token, and the second type is an information frame. In the Plant Management System referred to above, both tokens and information frames include a start-of-frame delimiter (SFD) and an end-of-frame delimiter (EFD). In that system, information transmitted by or received by the bus interface unit (BIU) of each module is in the form of binary signals which are Manchester encoded with each information bit included in a Manchester bit cell. The informational content of a Manchester bit cell is deemed a logical zero if the signal voltage level is initially low, a logical zero, in the first half-bit cell of the Manchester cell, and high, a logical one, in the second half-bit cell of the Manchester bit cell. A mid-bit low-to-high voltage transition thus occurs in the middle of a Manchester bit cell, the informational content of which is a logical zero. The informational content of a Manchester bit cell is deemed a logical one if the signal voltage level initially is high, a logical one, in the first half-bit cell; and low, a logical zero, in the second half-bit cell of the Manchester bit cell. A mid-bit high-to-low voltage transition thus occurs in the middle of a Manchester bit cell, the informational content of which is a logical one. Manchester encoding requires that there be a voltage transition, high-to-low or low-to-high, in the middle of each Manchester bit cell, a mid-bit transition. If no such mid-bit transition occurs in a Manchester bit cell, a code violation (CV) occurs.

In the Plant Management System referred to above, both start-of-frame delimiters (SFD) and end-of-frame delimiters (EFD) include code violations, four CV's each. By using CV's in such a manner, a four-bit error would have to occur to change valid Manchester encoded data into a frame delimiter.

Since every active module of the local-area network receives every information frame and token frame transmitted over the network's communication medium, it follows that the bus interface unit (BIU) of each module of the network must be able to identify in real time the unique patterns of Manchester encoded data which denote a start-of-frame and an end-of-frame delimiter since the address of the module, or modules, to which each frame is addressed immediately follows an SFD; and an EFD denotes, particularly to the module to which a token frame is addressed, that that module has the token and must transmit an information frame or transmit a token frame addressed to a successor module.

Thus there is a need to provide the BIU's of each module of a local-area network with a detector of predetermined patterns of Manchester encoded data signals substantially as received, which patterns may include code violations as well as properly encoded Manchester data.

BRIEF SUMMARY OF THE INVENTION

The detector of this invention detects in real time predetermined patterns of Manchester encoded data signals as applied serially to the detector, which signals include data signals representing Manchester code violations. The voltage level of each half-bit cell of each Manchester bit cell is clocked into a shift register capable of storing the voltage levels, or logic signals, of "n" Manchester bit cells, or 2 "n" half-bit cells, where "n", in the preferred embodiment, is eight. A receive clock signal from a decoder, which receive clock signal has a voltage transition of the desired polarity, or direction, substantially in the center of each half-bit cell of each Manchester bit cell of Manchester encoded data signals is applied to the detector. The logic values of the 2 "n" outputs of the shift register are applied to a programmable logic array device which produces an output signal every time the logic values of the 2 "n" outputs of the shift register have values satisfying the predetermined pattern. Outputs of the programmable logic array device can be stored in latches for use by other components of the module of which the bus interface unit is a part as long as needed.

It is, therefore, an object of this invention to provide a detector for unique patterns of Manchester encoded data, whenever those patterns occur in binary signals applied serially to the detector.

It is another object of this invention to provide a detector for predetermined patterns of Manchester encoded data, which patterns include Manchester code violations, as well as properly coded Manchester encoded data signals.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE INVENTION

Figure 1:
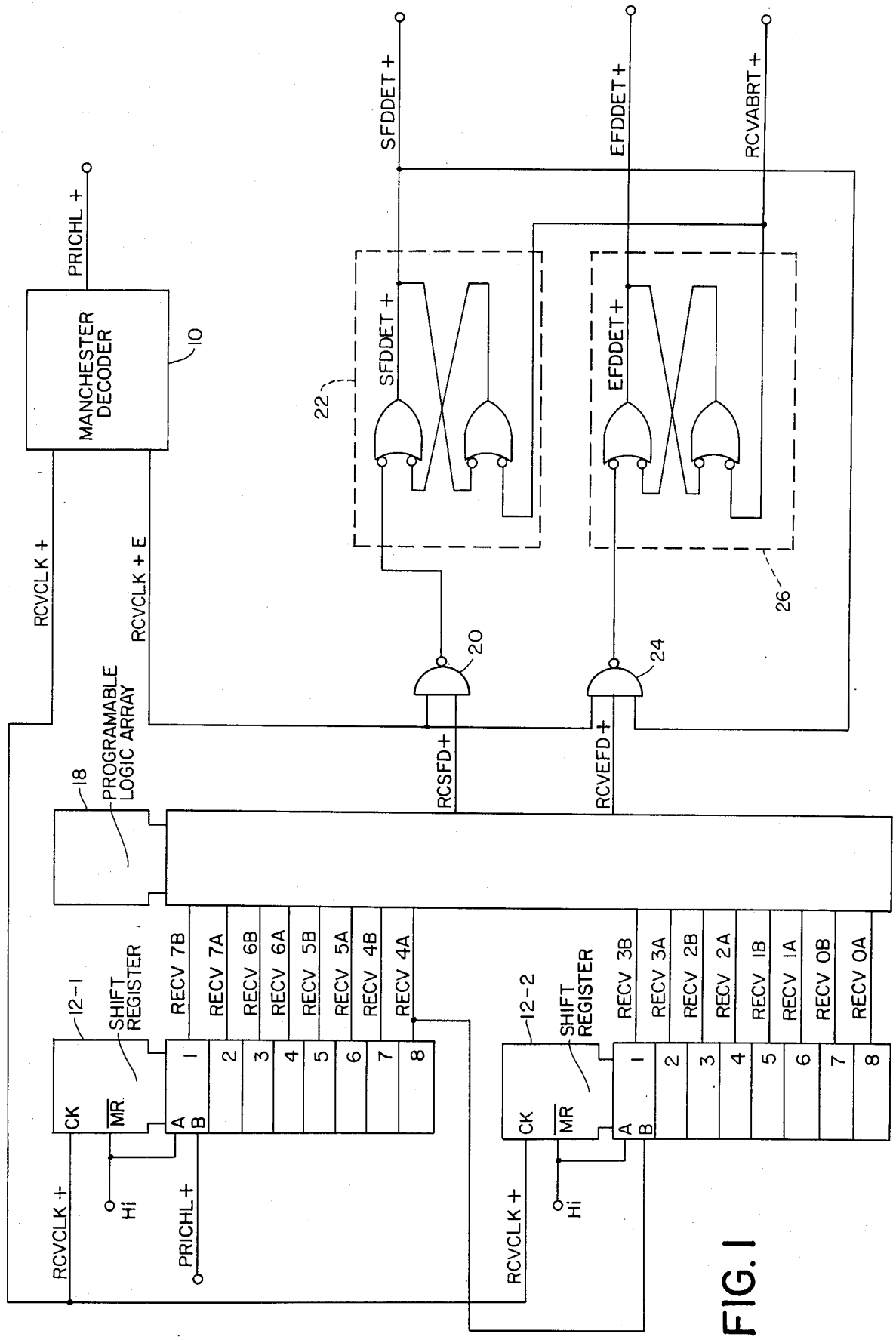
FIG. 1 is a schematic block diagram of the detector of this invention.

In FIG. 1, Manchester decoder 10 has applied to it Manchester encoded data signals such as are transmitted over the communication medium of a local-area network, which medium, in the preferred embodiment, is a pair of coaxial cables, or channels, over both of which the data signals are transmitted. One such channel is designated as the primary channel and is used as the source of the data signals PRICHL+ applied to decoder 10. The data signals PRICHL+ are also applied to data input terminal B of serial-in parallel-out shift register 12-1. Decoder 10, the details of which are disclosed and claimed in a related application identified supra, produces a receive clock signal RCVCLK+ having the desired type of voltage transition substantially in the center of each half-bit cell of each Manchester bit cell of PRICHL+ applied thereto. Decoder 10 also produces the signal RCVCLK+E, which is the RCVCLK+ signal delayed for a predetermined period of time for a reason that will be set forth below. In the preferred embodiment, RCVCLK+E is delayed by substantially 50 nanoseconds. The RCVCLK+ signals are applied to the clock terminals CK of shift registers 12-1 and 12-2. The master reset terminals MR and data input terminals A of registers 12-1 and 12-2 are both tied to a source of high voltage, a logic one. The B data input terminal of shift register 12-2 is connected to output 8 of register 12-1, the output of which is identified on FIG. 1 as signal RECV4A. In the preferred embodiment, shift registers 12-1 and 12-2 are type F164's, a high-speed 8-bit serial-in parallel-out shift register. Serial data is entered through a two-input terminal AND gate synchronously with the low-to-high transition of the RCVCLK+ applied to the clock inputs CK. By connecting registers 12-1 and 12-2 as illustrated in FIG. 1, a serial-in parallel-out shift register with 16 outputs, the number of half-bit cells found in eight Manchester encoded bit cells is produced.

Figure 2:
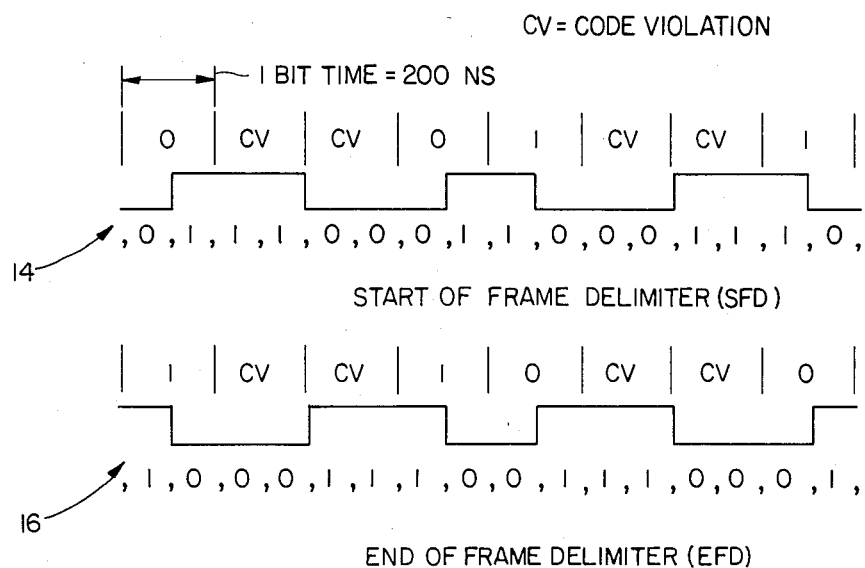
FIG. 2 illustrates the wave forms of a start-of-frame delimiter and of an end-of-frame delimiter.

In FIG. 2, the wave forms of a start-of-frame delimiter SFD 14 and of an end-of-frame delimiter EFD 16 are illustrated. Above each of the wave forms 14, 16 are located indicia which divide the wave forms 4, 16 into Manchester bit cells with the informational content, or value, of each Manchester bit cell being identified. For SFD 14, the values of each Manchester bit cell from left to right are 0, CV, CV, 0, 1, CV, CV, 1, where CV represents a code violation that occurs in a Manchester bit cell; i.e., one that is not encoded as required by the Manchester coding convention in that no mid-bit code transition occurs. For EFD 16, the values of each Manchester bit cell from left to right is 1, CV, CV, 1, 0, CV, CV, 0. Below the wave forms for both SFD 14 and EFD 16 are the logical values, or the voltage levels, of each half-bit cell of each of the Manchester bit cells forming an SFD 14 and an EFD 16. The logical values for the half-bit cells of SFD 14 are from left to right 0, 1, 1, 1, 0, 0, 0, 1, 1, 0, 0, 0, 1, 1, 1, 0, and for EFD 16, 1, 0, 0, 0, 1, 1, 1, 0, 0, 1, 1, 1, 0, 0, 0, 1. Thus, when the pattern of the 16 outputs, RECV 0A through RECV 7B have the values corresponding to an SFD 14 or an EFD 16, then the eight Manchester bit cells having these patterns of values are an SFD 14 or an EFD 16.

To determine when the 16 outputs of registers 12-1 and 12-2 have these predetermined patterns of logical values, or the Manchester encoded data has a predetermined pattern representing an SFD 14 or an EFD 16, the 16 outputs of registers 12-1 and 12-2 are applied to programmable array logic device 18, a type 16H2 programmable logic array. Device 18 is, in the preferred embodiment, programmed to produce a receive start-of-frame delimiter RCVSFD+ when the following logic equation is true:

$$RCVSFD+ = \overline{(RECV7B+)} + (RECV7A+) \cdot (RECV6B+) \cdot$$

$$(RECV6A+) \cdot \overline{(RECV5B+)} \cdot \overline{(RECV5A+)} \cdot \overline{(RECV4B+)} \cdot$$

$$(RECV4A+) \cdot (RECV3B+) \cdot \overline{(RECV3A+)} \cdot \overline{(RECV2B+)} \cdot$$

$$\overline{(RECV2A+)} \cdot (RECV1B+) \cdot (RECV1A+) \cdot (RECV0B+) \cdot$$

$$\overline{(RECV0A+)}$$

and will produce a receive end-of-frame delimiter RCVEFD+ when the following equation is true:

$$RCVEFD+ = (RECV7B+) \cdot \overline{(RECV7A+)} \cdot \overline{(RECV6B+)} \cdot$$

$$\overline{(RECV6A+)} \cdot (RECV5B+) \cdot (RECV5A+) \cdot (RECV4B+) \cdot$$

$$\overline{(RECV4A+)} \cdot \overline{(RECV3B+)} \cdot (RECV3A+) \cdot (RECV2B+) \cdot$$

$$(RECV2A+) \cdot \overline{(RECV1B+)} \cdot \overline{(RECV1A+)} \cdot \overline{(RECV0B+)} \cdot$$

$$(RECV0A+)$$

The signal RCVSFD+ is applied to one input of two input NAND gate 20. The other input to NAND gate 20 is the signal RCVCLK+E. RCVCLK+E enables gate 20 and is delayed with respect to the RCVCLK+ signal to compensate for the time it takes to produce the signal RCVSFD+ from the outputs of registers 12-1 and 12-2. When both the signals RCVSFD+ and RCVCLK+E are both true, or positive, at the same time, latch 22 is set and produces the signal start-of-frame delimiter detected, SFDDET+.

The signals RCVEFD+, RCVCLK+E and SFDDET+ are applied as inputs to three-input NAND gate 24. When all three inputs to NAND gate 24 are high, or true, at the same time, latch 26 is set and produces as its outputs a signal representing that the end-of-frame delimiter has been detected, EFDDET+. The requirement that gate 24 be enabled by the signal SFDDET+, as well as by the signal RECCLK+E, prevents the signal EFDDET+ from being produced unless a start-of-frame delimiter has been detected by the programmable array logic and latch 22 has not been reset in the interim.

The signal RCVABRT+ is applied to both latches 22, 26 to clear or reset them whenever a frame is detected, for example, which is not addressed to a given module of a local-area network, or after the frame has been received by the module to which it has been addressed.

Figure 3:
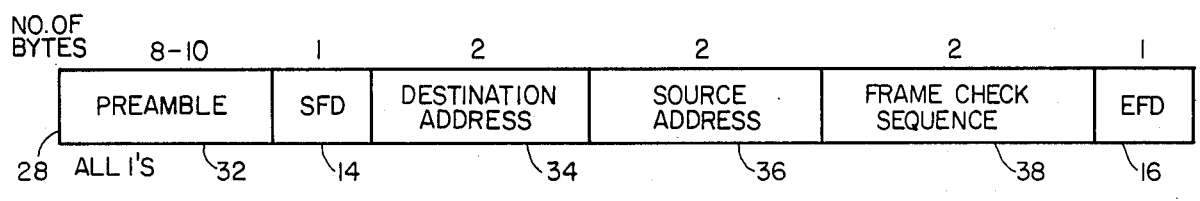
FIG. 3 is the format of a token-passing frame.
Figure 4:
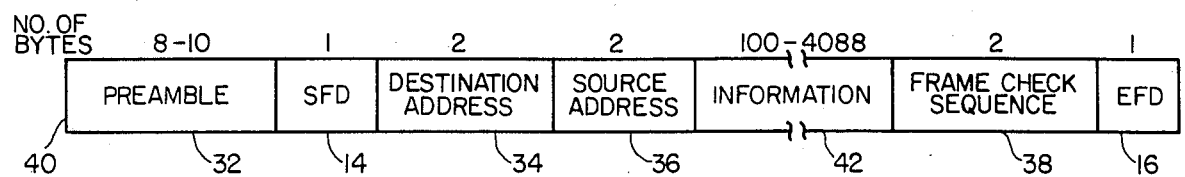
FIG. 4 is the format of an information frame.

In FIG. 3, the format of a token-passing frame, or token 28, is illustrated. A token-passing frame 28 includes from 8-10 bytes of a preamble. Preamble 32 consists of signals of the same type, such as logical ones. Preamble 32 is followed by a start-of-frame delimiter, SFD 14 of one byte, destination address field 34 of two bytes, a source address field 36 of two bytes, a frame check sequence 38 which is used to detect errors in token frame 28, and an end-of-frame delimiter EFD 16 of one byte. The format of information frame 40, which is illustrated in FIG. 4, differs from that of token frame 28 only by including an information field 42 of from 100-4,088 bytes in the preferred embodiment.

Because all frames of the local-area network include a start-of-frame delimiter SFD 14 and an end-of-frame delimiter EFD 16, the importance of the bus interface units of the modules of a local-area network being able to detect the unique and predetermined patterns of logic values of each half-bit cell of an SFD 14 and an EFD 16 is apparent.

From the foregoing, it is apparent that the detector of this invention has the capability of detecting in real time predetermined patterns of Manchester encoded data signals and, in particular, the capability of detecting such patterns when the encoded data signal includes code violations.

While the invention has been described with reference to illustrated embodiments, the description is for illustrative purposes and is not to be construed as lmiting the scope of the invention. Various modifications and changes may occur to those skilled in the art without departing from the true spirit and scope of the invention as defined by the claims hereof.

What is claimed is:

1. A detector for a unique pattern of Manchester encoded data in serially received Manchester encoded data signals in which each bit of data is in a Manchester bit cell with each such Manchester bit cell being divisible into two half-bit cells, comprising:
   means for producing a receive clock signal in synchronism with the encoded data signal as received, said receive clock signal having a voltage transition of one plarity substantially in the center of each half-bit cell of each Manchester bit cell of the received signal;
   receive data shift register means to which the encoded data signal and receive clock signal are applied for storing voltage levels of the encoded data signal at each voltage transition of one polarity of the receive clock, said shift register means storing the voltage levels of all of the half-bit cells of said pattern of the data signals; and
   programmable array logic means to which all of the voltage levels stored in the receive data shift register means are applied for producing an output signal when the pattern of voltages stored in the receive data shift register is said unique pattern.

2. A detector as defined in claim 1 in which the predetermined number of half-bit cells is sixteen.

3. A detector for detecting in Manchester encoded data signals a predetermined pattern of such data, each bit of such data being in a Manchester bit cell with each such bit cell being divisible into two half-bit cells;
   the binary value of each Manchester cell being determined by a voltage level transition substantially occurring between the two half-bit cells of each Manchester cell, comprising:
   receive data shift register means having a clock input terminal, a data input terminal, and "n" output terminals where "n" equals the number of half-bit cells of said pattern, said data-in terminal adapted to have applied to it Manchester encoded data signals, said clock input terminal adapted to have applied to it a receive clock signal having a voltage level transition of one type occurring substantially in the center of each half-bit cell of the Manchester encoded data signals applied to the data-in terminal, whereby the voltage level occurring substantially in the center of each half-bit cell of each Manchester cell is clocked into the data register and shifted therethrough;
   programmable array logic means having "n" input terminals connected to the "n" output terminals of the data shift register for producing an output signal when the "n" output terminals of the receive data shift register have said predetermined pattern; and
   circuit means including latch means to which the output signal of the programmable array logic means is applied for storing said output signal until cleared.

4. A detector as defined in claim 3 in which "n" equals eight.

5. A detector as defined in claim 4 in which the voltage level of one type is a low-to-high transition.

* * * * *